United States Patent

Wang et al.

[15] 3,649,178
[45] Mar. 14, 1972

[54] SYNTHESIS OF SODIUM ZEOLITE W-Z

[72] Inventors: Rong Wang; Jacob Michael Zielonka, both of Los Angeles, Calif.

[73] Assignee: American Cyanamid Company, Stamford, Conn.

[22] Filed: Apr. 17, 1969

[21] Appl. No.: 817,167

[52] U.S. Cl..........................................23/113, 252/455 Z
[51] Int. Cl. .......................................................C01b 33/28
[58] Field of Search.........................................23/111–113; 252/455 Z

[56] References Cited

UNITED STATES PATENTS

| | | | |
|---|---|---|---|
| 2,882,244 | 4/1959 | Milton | 23/113 |
| 3,054,657 | 9/1962 | Breck | 23/113 |
| 3,459,501 | 8/1969 | Plank et al. | 23/112 |

OTHER PUBLICATIONS

Barrer et al., " J. Chem. Soc." 1959, Part I, pp. 195–208
Jacobson " Encyclopedia of Chemical Reactions" Vol. 1, 1948, pg. 48

*Primary Examiner*—Edward J. Meros
*Attorney*—James H. Laughlin, Jr.

[57] ABSTRACT

Sodium Zeolite W-Z and a process for making sodium Zeolite W-Z having the chemical formula:

$$1.0 \pm 0.1 \, Na_2O \cdot Al_2O_3 \cdot 5.75 \pm 0.55 \, SiO_2 \cdot YH_2O$$

wherein Y is a number from 0 to 7 which comprises mixing sodium hydroxide, a source of silica, a source of alumina and water in the following mole ratios:

| | |
|---|---|
| $Na_2O/SiO_2$ | 0.8 to 1.9 |
| $SiO_2/Al_2O_3$ | 10.0 to 35.0 |
| $H_2O/Na_2O$ | 100.0 to 160.0 | to obtain a gel-form mixture, digesting the gel mixture for a period of time from 12 to 200 hours, heating the digested mixture at a temperature of from 50° to 150° C. for from 1 to 5 days and recovering sodium Zeolite W-Z. Sodium Zeolite W-Z can be ion-exchanged to obtain a crystalline aluminosilicate having catalytic activity for use in hydrocarbon conversion processes.

4 Claims, No Drawings

SYNTHESIS OF SODIUM ZEOLITE W-Z

This invention relates to a new synthetic crystalline aluminosilicate and to a process for preparing the same. More particularly, this invention relates to a novel sodium synthetic crystalline aluminosilicate and to a process for preparing the same wherein silica gel is employed as a reactant.

A number of crystalline aluminosilicates having a structure of rigid three-dimensional networks characterized by uniform pore openings of between about 6 and about 15 Angstrom units in diameter are known in the art. Each species of crystalline aluminosilicate can be identified by its chemical composition and its unique X-ray powder diffraction pattern. The uniform pore openings permit the entrance of small size molecules into the interior of the crystalline aluminosilicates while excluding larger size molecules. Accordingly, crystalline aluminosilicates are useful in a number of processes including separation of gases by a selective absorption and catalytic conversion such as catalytic cracking.

The crystalline aluminosilicates are generally formed by reacting a silica source, an alumina source and an alkali metal source under specific conditions to form the crystalline product having water of hydration within the pores thereof. The water of hydration is then removed from the crystalline aluminosilicate to form the uniform sized pores therein. Generally, when it is desired to employ the crystalline aluminosilicates in catalytic conversion processes, such as catalytic cracking, the crystalline aluminosilicate is ion-exchanged to remove the great majority of the alkali metal and to substitute therefor catalytic sites such as hydrogen ion or another metal ion such as a rare earth metal ion. It has been found that crystalline aluminosilicates provide improved activity and selectivity in catalytic conversion processes as compared to amorphous silica-alumina catalysts. Furthermore, in order for an aluminosilicate to function in a selective absorption process, it must be in the crystalline form.

Unfortunately it is difficult to predict whether or not a crystalline aluminosilicate can be obtained by merely adjusting reactant compositions or reaction conditions. As a result there have evolved a great many processes for producing synthetic crystalline aluminosilicates which minimize or eliminate the production of amorphous products. Furthermore, a large number of crystalline aluminosilicate species have been produced, each being characterized by a distinctive X-ray powder diffraction pattern.

The conventional method of preparing crystalline aluminosilicates involves heating a solution of a mixture of oxides of aluminum, silicon and an alkali metal in water at a suitable temperature for a sufficient period of time to cause crystallization of the aluminosilicate product. After the product is crystallized out, the desired material is filtered off, washed with a distilled water until the wash water has a proper pH, and then activated by heating to effect the desired degree of dehydration. The composition and structure of the crystalline aluminosilicate which is formed depends upon a number of factors including mole ratio of reactants, the particular reactant employed to provide the silica and alumina, the conditions of time and temperature under which the reaction mixtures are digested to obtain the product, and the particular alkali metal oxides employed.

The production of crystalline Zeolite S is disclosed in U.S. Pat. No. 3,054,657 issued Sept. 18, 1962. As disclosed therein, the oxide mole ratios of reactants employed fall within the ranges set forth below when the source of silica is an aqueous colloidal silica sol:

| | |
|---|---|
| $Na_2O/SiO_2$ | 0.3 to 0.6 |
| $SiO_2/Al_2O_3$ | 6.0 to 10.0 |
| $H_2O/Na_2O$ | 20.0 to 100.0 |

The patent is devoid of any teaching of the use of a reaction mixture containing a higher mole ratio of silica to alumina when employing a colloidal silica sol reactant.

U.S. Pat. No. 3,248,170 is also exemplary of the prior art and discloses the preparation of a sodium crystalline aluminosilicate from reaction mixtures having the following oxide mole ratio:

| | |
|---|---|
| $Na_2O/SiO_2$ | 0.15 to 0.6 |
| $SiO_2/Al_2O_3$ | 2.0 to 10.0 |
| $H_2O/Na_2O$ | 30.0 to 200.0 |

The patentee discloses that when a reaction mixture is maintained within the above oxide mole ratio range, a new product identified as sodium Zeolite U is obtained.

It is an object of the present invention to provide a novel crystalline aluminosilicate. It is a further object of the present invention to provide a method for the preparation of a novel sodium crystalline aluminosilicate. Further objects of the present invention will become evident in view of the following detailed discussion.

In accordance with the present invention, it has been discovered that a novel crystalline aluminosilicate which for convenience is identified herein as sodium Zeolite W-Z, can be prepared by forming a reaction mixture of sodium hydroxide, a source of alumina, a colloidal silica and water, the composition of which is expressed in terms of oxide mole ratios, is as follows:

| | |
|---|---|
| $Na_2O/SiO_2$ | 0.8 to 1.9 |
| $SiO_2/Al_2O_3$ | 10.0 to 35.0 |
| $H_2O/Na_2O$ | 90.0 to 160.0 |

The reaction mixture is heat-aged for a certain period until the desired crystalline sodium aluminosilicate begins to precipitate therefrom and by suitable means it is then worked up to isolate the crystalline aluminosilicate products.

Chemically, sodium Zeolite W-Z is identified by the following chemical formula:

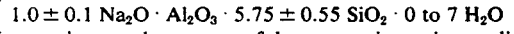

$$1.0 \pm 0.1 \, Na_2O \cdot Al_2O_3 \cdot 5.75 \pm 0.55 \, SiO_2 \cdot 0 \text{ to } 7 \, H_2O$$

In carrying out the process of the present invention, sodium hydroxide, colloidal silica, a source of alumina, and water are mixed to obtain the reaction mixture of the above-noted compositions. The preferred method for forming the reaction mixture is to add sodium aluminate to sodium hydroxide aqueous solution and then to add the silica source thereto.

The alumina can be provided by employing sodium aluminate, alumina gel, aluminum metal or aluminum powder as a reactant. As noted above, for the purposes of the present invention it is desirable to supply the silica content by use of an aqueous suspension of colloidal silica. Ludox AM aqueous silica suspension containing 30 percent by weight of colloidal silica is eminently suitable for the practice of the present invention.

After the reaction mixture is formed, it is aged until the desired crystalline aluminosilicate precipitates therefrom. Preferably, aging is conducted in two stages. The first stage being at room temperature and the second stage being at an elevated temperature. Digestion of the reaction mixture at room temperature can be from a period varying from 12 to 200 hours or preferably from 24 to 72 hours. The precipitate has the appearance of a gel ranging in color from cloudy white to colorless. There is also a colorless liquid phase which contains excess water and excess unused ions not found in precipitated gel. When the reaction mixture has been allowed to digest at room temperature for the desired length of time, it is then brought to an elevated temperature for the purpose of accomplishing the second stage of aging. Aging at elevated temperature can be accomplished at a temperature in the range of 50° to 150° C., preferably 80° to 120° C. for a period sufficient to allow the formation of the desired crystalline material. Normally, reasonable amounts of the desired product are formed within 1 to 5 days at the aging temperature. After aging has been accomplished either in one or two steps, the product can be separated from the mother liquor of the reaction mixture by any suitable means such as decantation. Preferably the crystals are then washed in distilled water until the pH of the wash water is about 9.5 to 10.5 indicating that the crystals are free of excess sodium. The product, after drying at a suitable temperature such as 100°–110° C. can be identified by chemical analysis and by X-ray powder diffraction patterns.

In Table I below, the product of the present invention, sodium Zeolite W-Z is identified by means of its X-ray powder diffraction pattern which is compared with the X-ray powder diffraction patterns of Zeolite S, natural gmelinite, Barrer's species S and sodium Zeolite U. For purposes of measuring the X-ray diffraction pattern, monochromatic copper K alpha radiation was used with a Guinier-type focusing camera. The peak heights of the radiation (indicated by the symbol: I) and the intensity of the strongest line or peak (represented by the symbol: $I_o$) provides the basis for calculating the relative intensities and the interplanar spacing in Angstrom units (d) corresponding to the lines recorded on the film in the X-ray camera. The X-ray diffraction patterns differ in many respects thus showing a difference in crystalline structure for each of the crystalline aluminosilicates.

TABLE I

| Line | Na zeolite W-Z | | Na zeolite U | | Na zeolite S | | Barrer species S | | Natural gmelinite | |
|---|---|---|---|---|---|---|---|---|---|---|
| | d | 100 (I/I$_0$) | d | 100 (I/I$_0$) | d | 100 (I/I$_0$) | d | 100 (I/I$_0$) | d | 100 (I/I$_0$) |
| 1 | 11.62(B) | 14 | 11.5 | 60 | 11.88 | 77 | 11.8 | 80 | 12.0 | 90 |
| 2 | 9.36(B) | 35 | 9.3 | 45 | | | 9.5(B) | | | |
| 3 | 7.03 | 29 | | | 7.73 | 19 | | | 7.69 | 60 |
| 4 | 6.87 | 57 | 6.8 | 80 | 7.16 | 100 | 6.85 | 100 | 6.81 | 40 |
| 5 | | | | | 5.96 | 9 | | | 5.99 | 10 |
| 6 | 5.50 | 10 | 5.43 | 15 | | | | | | |
| 7 | 5.03 | 56 | 4.98 | 85 | 5.03 | 73 | 5.01 | 100 | 5.07 | 60 |
| 8 | | | | | 4.50 | 46 | 4.46 | 40 | 4.53 | 20 |
| 9 | 4.31(B) | 72 | 4.23 | 75 | 4.12 | 79 | | | | 20 |
| 10 | 4.10 | 26 | | | 3.97 | 20 | 3.96 | 40 | 4.10 | 100 |
| 11 | 3.97 | 26 | 3.42 | 70 | 3.44 | 62 | 3.43 | 100 | 3.44 | 20 |
| | | | | | 3.30 | 13 | | | | |
| 12 | | | | | 3.24 | 23 | 3.28 | 5 | 3.22 | 60 |
| 13 | 3.44 | 48 | | | | | 3.17 | 10 | | |
| 14 | | | | | | | | | 3.09 | 5 |
| 15 | 3.19 | 22 | | | 2.97 | 80 | 2.97 | 60 | 2.96 | 80 |
| 16 | 3.12 | 15 | 2.90 | 100 | | | 2.90 | 40 | | |
| 17 | 3.03 | 30 | | | 2.86 | 47 | 2.83 | 40 | 2.85 | 60 |
| | | | | | 2.69 | 19 | | | 2.67 | 60 |
| 18 | 2.92(B) | 100 | 2.59 | 40 | 2.60 | 39 | 2.59 | 100 | 2.57 | 10 |
| 19 | | | 2.28 | 10 | 2.13 | 11 | 2.28 | 20 | 2.29 | 20 |
| | | | | | | | 2.11 | 20 | 2.20 | 5 |
| | | | | | | | 2.08 | 100 | | |
| 20 | 2.69 | 13 | 2.07 | 35 | 2.09 | 39 | 1.90 | 60 | 2.08 | 40 |
| | | | | | | | 1.80 | 100 | | |
| 21 | 2.60 | 40 | 2.07 | | 1.91 | 12 | 1.72 | 100 | 1.99 | 5 |
| | 2.30 | 12 | | | | | 1.69 | 60 | | |
| | | | | | | | 1.67 | 60 | | |
| 22 | 2.13 | 9 | 2.07 | | 1.81 | 40 | 1.65 | 20 | 1.94 | 10 |
| | 2.09 | 28 | | | | | 1.64 | 20 | 1.81 | 10 |
| | 1.91 | 13 | | | | | | | | |
| | 1.81 | 26 | | | | | | | | |

NOTE.—B = Broad line.

As is evident from Table I, sodium Zeolite W-Z differs from Zeolite S and natural gmelinite since the 7.7 Angstrom line is missing in sodium Zeolite W-Z. Sodium Zeolite W-Z differs from Barrer Species S and sodium Zeolite S since the line at 4.31 Angstroms is missing in Barrer Species S and sodium Zeolite S. Sodium Zeolite W-Z differs from sodium Zeolite U by a slight position difference in line 6 and line 9 and intensity difference in lines 1 and 2. Furthermore, the line 15 with 3.19 Angstroms and line 3 with 7.03 Angstroms in sodium Zeolite W-Z are missing in sodium Zeolite U.

While Zeolite W-Z is obtained by employing reaction systems within the above-noted ranges, the yield of sodium Zeolite W-Z varies within these ranges. Within the scope of the present invention the following ranges are preferred since the yield of W-Z is greatly increased.

| | |
|---|---|
| $Na_2O/SiO_2$ | 1.0 to 1.9 |
| $SiO_2/Al_2O_3$ | 16.0 to 30.0 |
| $H_2O/Na_2O$ | 100.0 to 140.0 |

Sodium Zeolite W-Z can be ion-exchanged by any method well known in the art to obtain a crystalline aluminosilicate having catalytic activity which promotes its use in hydrocarbon conversion processes such as hydrogenation, dehydrogenation, isomerization, reforming, cracking, hydrocracking, polymerization, alkylation and dealkylation whereby in general the hydrocarbon starting material is converted to a higher grade more valuable product.

The following examples illustrates the present invention and are not intended to limit the same.

EXAMPLE I

A sodium hydroxide solution was made by adding 30.2 grams of NaOH to 660 grams deionized water. The solution was stirred until all solids dissolved. To this solution was added 2.61 grams of $Na_2O \cdot Al_2O_3 \cdot 3H_2O$. The solution was stirred at room temperature for about 30 minutes. This solution was then rapidly added to 60 grams of Ludox AM (30 weight percent $SiO_2$). The gel mixture was stirred for about one hour (until homogeneous). The gel mixture, having a composition in terms of molar ratios of oxides of:

| | | |
|---|---|---|
| $Na_2O/SiO_2$ | = | 1.3 |
| $SiO_2/Al_2O_3$ | = | 25 |
| $H_2O/Na_2O$ | = | 100 | was then digested at room temperature in a sealed vessel for 48 hours. The sample was then agitated and heated in an oven set at 90° C. for 60 hours. Upon cooling, the crystalline solids were separated from the mother liquor by decantation and washed with deionized water until the pH of the wash water became about 10. The solid product was then dried at 95°–105° C. for a few hours. An elemental analyses revealed the product to have the following composition:

$$0.96\ Na_2O \cdot Al_2O_3 \cdot 6.11\ SiO_2 \cdot 4.2\ H_2O$$

An X-ray diffraction analysis characterized the product as about 80 percent sodium Zeolite W-Z having the following diffraction pattern wherein d is the interplanar spacing and I is the intensity.

| d (observed in A.) | 100I/I$_{max}$ |
|---|---|
| 11.62 (B)* | 14 |
| 9.36 | 35 |
| 7.03 | 29 |
| 6.87 | 57 |
| 5.50 | 10 |
| 5.03 | 56 |
| 4.31 (B) | 72 |
| 4.10 | 26 |
| 3.97 | 26 |
| 3.44 | 48 |
| 3.19 | 22 |
| 3.12 | 15 |
| 3.03 | 30 |
| 2.92 (B) | 100 |
| 2.69 | 13 |
| 2.60 | 40 |
| 2.30 | 12 |
| 2.13 | 9 |
| 2.09 | 28 |
| 1.91 | 13 |
| 1.81 | 26 |

*Broad Line

EXAMPLE 2

A sodium hydroxide solution was made by adding 24 grams of NaOH to 700 grams of deionized water. The solution was stirred until all solids dissolved. To this solution was added 0.81 gram aluminum powder of particle size less than 100 microns. A semiviolent reaction occurred during which time stirring was stopped until all the $H_2$ evolved. Upon the completion of the reaction, the solution was stirred at room temperature for about 30 minutes. This solution was then rapidly added to 60 grams of Ludox AM (30 wt. % $SiO_2$). The gel mixture was stirred for about 1 hour (until homogeneous). The gel mixture, having a composition in terms of molar ratios of oxides of:

| | | |
|---|---|---|
| $Na_2O/SiO_2$ | = | 1.0 |
| $SiO_2/Al_2O_3$ | = | 20.0 |
| $H_2O/Na_2O$ | = | 140.0 | was then digested at room temperature in a sealed vessel for 48 hours. The sample was then agitated and heated in an oven set at 90° C. for 60 hours. Upon cooling the crystalline solids were separated from the mother liquor by decantation and washed with deionized water until the pH of the wash water became about 10. The solid product was then dried at 95°–105° C. for a few hours. An elemental analysis revealed the product to have the following composition:

1.03 $Na_2O$ · $Al_2O_3$ · 5.41 $SiO_2$ · 3.7 $H_2O$

An X-ray diffraction analysis characterized the product as about 90 percent sodium Zeolite W-Z having the diffraction pattern shown in Example 1.

EXAMPLE 3

A sodium hydroxide solution was made by adding 35.1 grams of NaOH TO 770 grams deionized water. The solution was stirred until all solids dissolved. To this solution was added 2.61 grams of $Na_2O$ · $Al_2O_3$ · $3H_2O$. The solution was then rapidly added to 60 grams of Ludox AM (30 wt. % $SiO_2$). The gel mixture was stirred for about one hour (until homogeneous). The gel mixture having a composition in terms of molar ratios of oxides of:

| | | |
|---|---|---|
| $Na_2O/SiO_2$ | = | 1.5 |
| $SiO_2/Al_2O_3$ | = | 25.0 |
| $H_2O/Na_2O$ | = | 100.0 | was then digested at room temperature in a sealed vessel for 48 hours. The sample was then agitated and heated in an oven set at 95° C. for 50 hours. Upon cooling, the crystalline solids were separated from the mother liquor on decantation and washed with deionized water until the pH of the wash water became about 10. The solid product was then dried at 95°–105° C. for a few hours. An elemental analysis revealed the following composition:

1.08 $Na_2O$ · $Al_2O_3$ · 5.96 $SiO_2$ · 3.3 $H_2O$

An X-ray diffraction analysis characterized the product as about 90 percent sodium Zeolite W-Z having the diffraction pattern shown in Example 1.

EXAMPLE 4

A sodium hydroxide solution was made by adding 31.2 grams NaOH to 950 grams of deionized water. The solution was stirred until all solids dissolved. To this solution was added 1.88 grams aluminum powder of particle size less than 100 microns. A semiviolent reaction occurred during which time stirring was stopped until all the $H_2$ evolved. Upon the completion of the reaction, the solution was stirred at room temperature for about 30 minutes. This solution was then rapidly added to 60 grams of Ludox AM (30 wt. % $SiO_2$). The gel mixture was stirred for about 1 hour (until homogeneous). The gel mixture having a composition in terms of molar ratios of oxides of:

| | | |
|---|---|---|
| $Na_2O/SiO_2$ | = | 1.3 |
| $SiO_2/Al_2O_3$ | = | 15.0 |
| $H_2O/Na_2O$ | = | 140.0 | was then digested at room temperature in a sealed vessel for 48 hours. The sample was then agitated and heated in an oven at 90° C. for 60 hours. Upon cooling, the crystalline solids were separated from the mother liquor by decantation and washed with deionized water until the pH of the wash water became about 10. The solid product was then dried at 95°–105° C. for a few hours. An elemental analysis revealed the product to have the following composition:

0.94 $Na_2O$ · $Al_2O_3$ · 5.08 $SiO_2$ · 3.2 $H_2O$

An X-ray diffraction analysis characterized the product as about 80 percent sodium Zeolite W-Z having the diffraction pattern shown in Example 1.

We claim:

1. A process for making sodium Zeolite W-Z having the chemical formula:

1.0±0.1 $Na_2O$ · $Al_2O_3$ · 5.75±0.55 $SiO_2$ · $YH_2O$ wherein Y is a number from 0 to 7 which comprises mixing sodium hydroxide, a source of silica, a source of alumina and water in the following mole ratios:

| | |
|---|---|
| $Na_2O/SiO_2$ | 1.0 |
| $SiO_2/Al_2O_3$ | 20.0 |
| $H_2O/Na_2O$ | 140.0 | to obtain a gel-form mixture, digesting the gel mixture for a period of time of from 12 to 200 hours, heating the digested mixture at a temperature of from 50° to 150° C. for from 1 to 5 days and recovering sodium Zeolite W-Z.

2. The process of claim 1 wherein the source of silica is an aqueous silica suspension.

3. The process of claim 1 wherein the source of alumina is sodium aluminate.

4. The process of claim 1 wherein the source of alumina is aluminum metal.

* * * * *